United States Patent [19]

Imanari et al.

[11] Patent Number: 5,489,963
[45] Date of Patent: Feb. 6, 1996

[54] AUTO-FOCUSING DEVICE

[75] Inventors: Hitoshi Imanari, Yokohama; Yoshiro Kodaka, Kawasaki, both of Japan

[73] Assignee: Nikon Corporation, Tokyo, Japan

[21] Appl. No.: 208,408

[22] Filed: Mar. 10, 1994

[30] Foreign Application Priority Data

Mar. 12, 1993 [JP] Japan .................................. 5-078722

[51] Int. Cl.$^6$ ................................................. G03B 13/36
[52] U.S. Cl. ......................................................... 354/402
[58] Field of Search .................................. 354/400, 402, 354/401, 195.1

[56] References Cited

U.S. PATENT DOCUMENTS

| | | | |
|---|---|---|---|
| 4,864,344 | 9/1989 | Arakawa et al. | 354/400 |
| 4,908,647 | 3/1990 | Ueyama | 354/402 |
| 4,959,728 | 9/1990 | Takahashi et al. | 354/286 X |

*Primary Examiner*—W. B. Perkey

[57] ABSTRACT

An auto-focusing device adapted for use with a camera. The device includes an auto-focusing optical system having a lens barrel anchoring section, a support member and a drive unit for causing the auto-focusing optical system to be moved into a desired position. The drive unit causes the auto-focusing optical system to be moved along a plane containing the optical axis of the auto-focusing optical system. The support member supports the auto-focusing device in the camera. The device also includes an energizing member which eliminates extraneous movement of the auto-focusing optical system. The energizing member has particular energizing characteristics and is positioned between the lens barrel anchoring section and the support member. Additionally, the auto-focusing device includes a drive direction detection unit which detects a drive direction of the auto-focusing optical system and a drive control unit which controls the drive unit by modifying drive control parameters which are set based on the drive direction detected by the drive direction detection unit and the particular energizing characteristics of the energizing member.

5 Claims, 3 Drawing Sheets

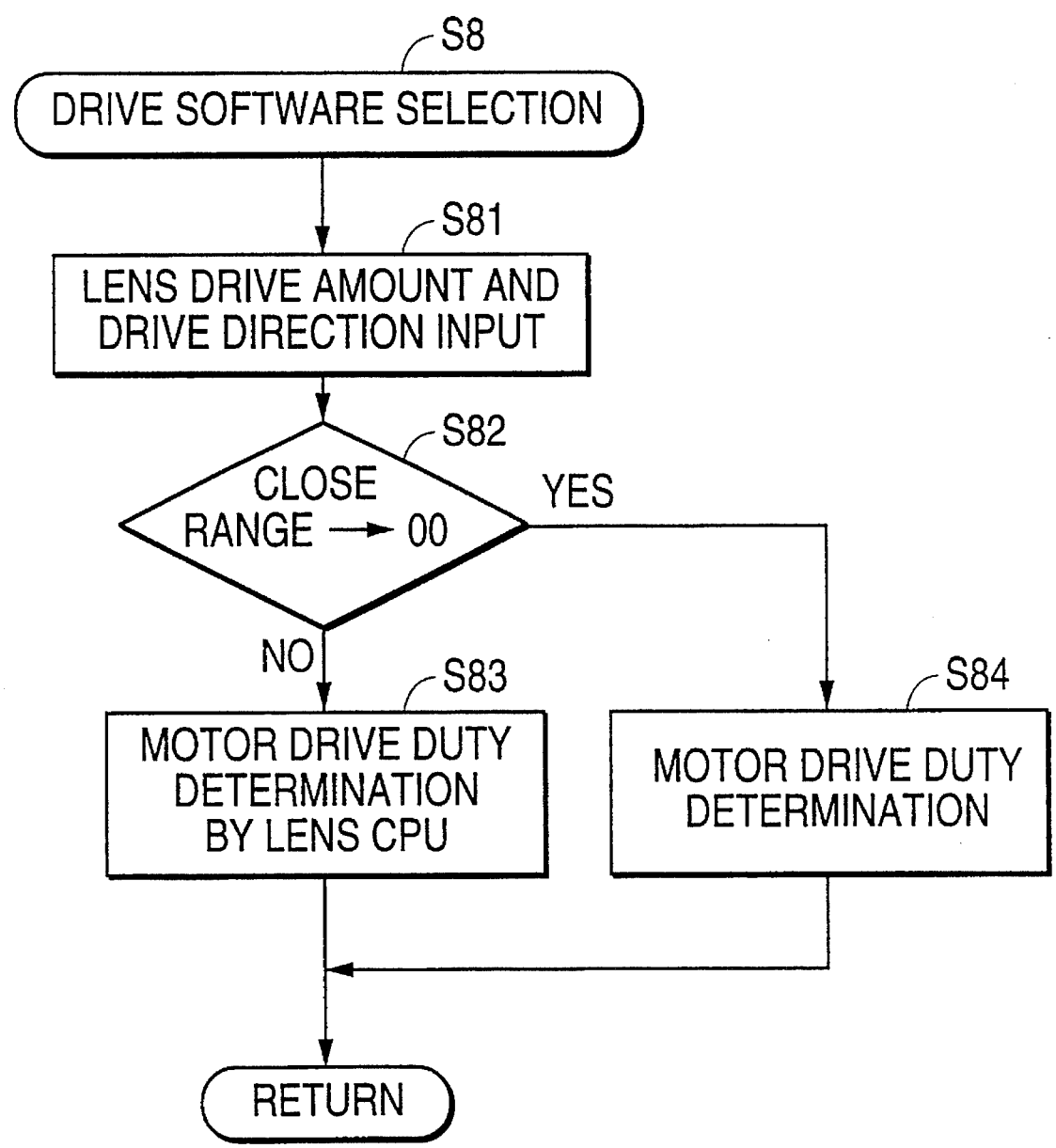

AUTO-FOCUSING DEVICE

BACKGROUND OF THE INVENTION

1. Field of the Invention

The present invention relates to an auto-focusing device used in cameras and the like.

2. Description of the Related Art

It is well known to provide automatic focus adjustment in cameras and the like. Cameras which provide auto-focusing operations, typically perform lens movement or drive operations starting from pre-set positions and directions during focusing operations in order to eliminate the influence of play or extraneous movement in a camera's focusing optical system. One such typical auto-focusing apparatus is disclosed in Japanese Patent Publication No. 63-144334.

Typical auto-focusing apparatus of the types briefly mentioned above and described in the cited Japanese Patent Publication No. 63-144334 are riddied with numerous problems. For example, conventional auto-focusing apparatus are devised so that they cause a lens barrel structure to return to an initial starting position after driving a lens past its focal point. Moreover, in the case where lens drive operations are performed starting from positions and directions which are opposite to an in-focus position, performance of quick and smooth focusing is extremely difficult.

In order to solve the aforementioned problem, it is conceivable that the influence of play or extraneous movement could be eliminated by inserting an energizing member, such as a spring, between a lens' anchored barrel and its support member which supports the focusing optical system. Such configurations, however, result in a lower drive capacity when a focusing optical system is driven in the direction from an infinity position to a close-range position and when the focusing optical system is driven in opposite directions.

In addition to the aforementioned problem, there is another problem which is typically seen in auto-focusing apparatus. More particularly, when there is a forward return disparity in the drive capacity of an auto-focusing apparatus, a separate problem develops in that it often becomes difficult to stop the focusing optical system at the target position quickly and accurately.

SUMMARY OF THE INVENTION

Accordingly, it is an object of the present invention to solve the abovementioned and other problems associated with conventional auto-focusing apparatus.

It is yet a further object of the present invention to provide an auto-focusing apparatus which is capable of quickly and accurately stopping a focusing optical system at a target position even in the case where an energizing member which eliminates play in the focusing optical system is fixed between a lens' anchored barrel and its support member.

Accordingly, the foregoing objects and other objects of the present invention are achieved by providing an auto-focusing device adapted for use with a camera. The auto-focusing device includes an auto-focusing optical system having a lens barrel anchoring section, a support member and a drive unit for causing the auto-focusing optical system to be moved into a desired position. The drive unit causes the auto-focusing optical system to be moved along a plane containing the optical axis of the auto-focusing optical system. The support member supports the auto-focusing device on the camera. The device also includes an energizing member which eliminates extraneous movement of the auto-focusing optical system. The energizing member has particular energizing characteristics and is positioned between the lens barrel anchoring section and the support member. Additionally, the auto-focusing device includes a drive direction detection unit which detects a drive direction of the auto-focusing optical system and a drive control unit which controls the drive unit by modifying drive control parameters which are set based on the drive direction detected by the drive direction detection unit and the particular energizing characteristics of the energizing member.

Additional objects and advantages of the invention are set forth in the description that follows. Moreover, such objects and advantages will be apparent from the description, or may be readily appreciated through practice of the invention.

BRIEF DESCRIPTION OF THE DRAWINGS

The above-listed and other objects and advantages of the present invention will become apparent and more readily appreciated from the following description of the preferred embodiment, taken in conjunction with the accompanying drawings of which:

FIG. 3 is a flow chart which shows the operation of a sub-routine called from logic performed during processing which is illustrated in FIG. 2.

DESCRIPTION OF THE PREFERRED EMBODIMENT

Figure 1:
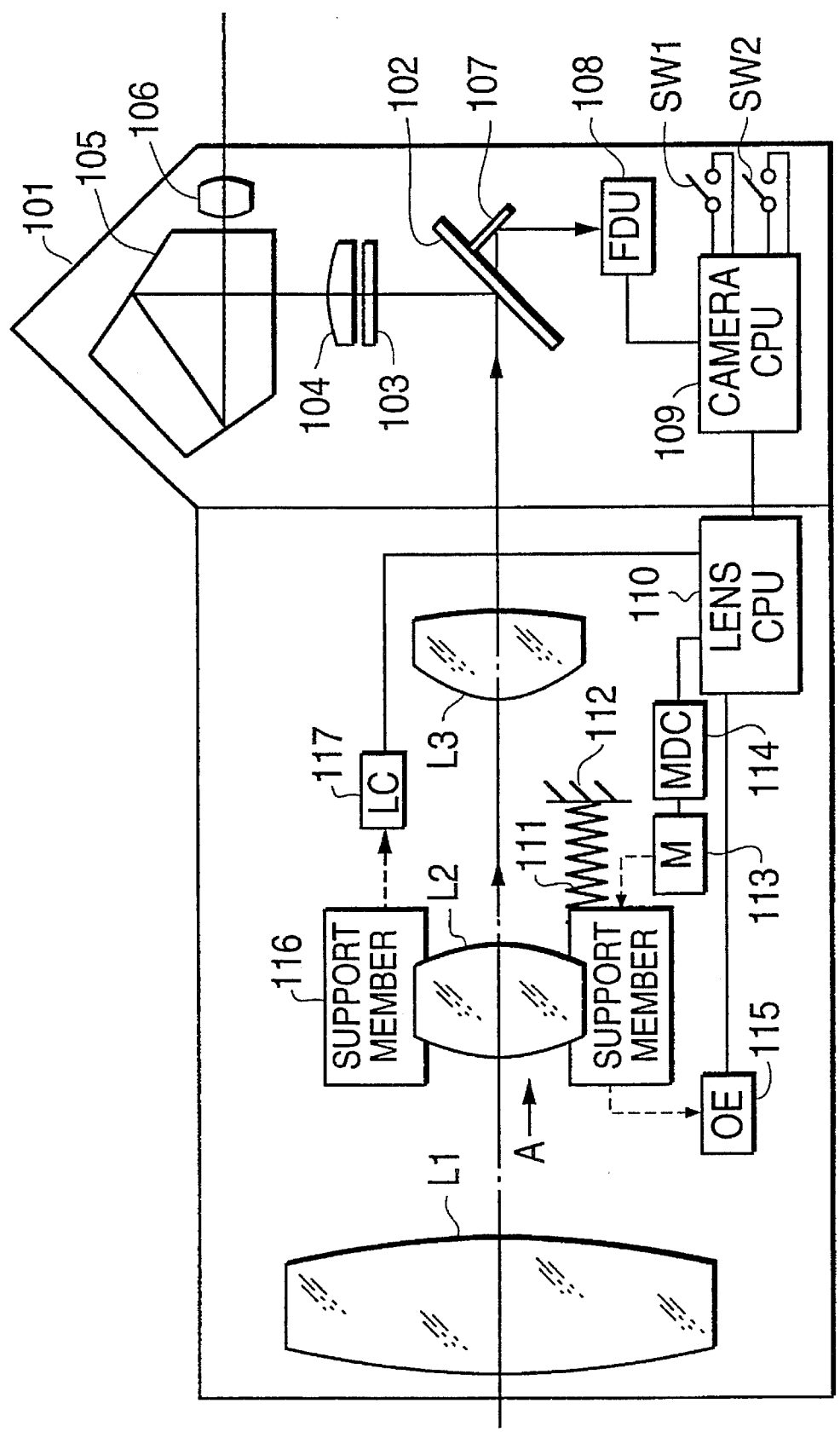
FIG. 1 is a diagram which shows an embodiment of an auto-focusing device according to the principles of the present invention.

Reference will now be made in detail to a preferred embodiment of the present invention, examples of which are illustrated in the accompanying drawings, wherein like reference numerals refer to like elements throughout.

Referring now to FIG. 1, therein depicted is a diagram which shows an embodiment of an auto-focusing device for use in a camera according to the principles of the present invention. In particular, luminous flux from a subject to be photographed reaches semi-transparent mirror 102 of camera body 101 through picture-taking lenses L1, L2 and L3. Part of the luminous flux is reflected to form the image of the subject on a focusing screen 103. An image formed on focusing screen 103 is directed to a photographer's eye through a condenser lens 104, a pentagonal prism 105 and a viewfinder eye piece 106.

Part of the light which has passed through semi-transparent mirror 102 is reflected by a sub-mirror 107 and is directed to a focal point detection unit (FDU) 108. The output signal from focal point detection unit 108 is input to a camera CPU 109, which contains a common focus control circuit which derives drive direction and drive amount of focusing optical system L2. The drive direction and drive amount signals are transmitted to a lens CPU 110 and a lens barrel. The drive direction and drive amount of the focusing optical system L2 are determined through lens CPU 110. A motor driver circuit (MDC) 114 is used to drive a motor (M) 113 which drives a support member 116, which supports the focusing optical system L2. Movement of the focusing optical system L2 is done in the direction of the system's optical axis. Motor drive forces are applied to the focusing optical system until a desired drive amount is reached. When drive of the focusing optical system is finished, the focus condition is again detected, and when it is out of focus, the aforementioned operations are repeated until an in-focus condition is reached.

In order to detect movement of the support member 116 in the direction of the optical axis, a limit circuit (LC) 117 is included. When the focusing optical system L2 reaches the infinity or close-range positions, a signal is transmitted to the lens CPU 110, and the drive direction of the focusing optical system L2 is reversed.

An optical encoder (OE) 115 is positioned on the left side of the supporting member 116. Through encoder 115, the configuration becomes such that signals such as those for the support member's 116 drive direction and drive amount in the direction of the optical axis are transmitted to the lens CPU 110.

In addition to the structure described above, a spring 111 is positioned between a lens anchoring section 112 and the support member 116 of the focusing optical system L2 in order to prevent play in the optical system. In FIG. 1, the direction indicated by arrow A is the direction when the lens of system L2 is driven from an infinity position to a close-range position. While the capacity of the spring 111 is set so that fluctuations in capacity are as few as possible from an infinity position to a close-range position, spring 111 is set to a capacity which is sufficient to prevent play in the focusing optical system L2 and the support member 116. When the capacity required to drive focusing optical system L2 and the support member 116 is considered to be T1, the average capacity of the spring 111 from an infinity position to a close-range position is considered to be T2, and the actual capacity to drive the lens of system L2 from an infinity position to a close-range position is considered to be TM, the following equation is obtained:

$$TM=T1+T2 \quad \text{..............................Equation 1.}$$

In the same way, when the actual capacity to drive the lens of system L2 from a close-range position to an infinity position is considered to be TN, the following equation is obtained:

$$TN=T1-T2 \quad \text{..............................Equation 2.}$$

As such, the aforementioned discussions of Equations 1 and 2 indicate that TM>TN. Therefore, a forward-return disparity occurs in the drive capacity. According to a commonly known feedback control method, the motor control method when motor drive is performed is expressed by the following equation having the following variables and constant values:

$$Md=\alpha(P-Q)+\beta(V1-VL)+\tau\int (P-Q)dt \quad \text{..............Equation 3.}$$

Wherein:
Md=motor drive duty (Duty)
V1=target speed
VL=lens speed
P=target position
Q=lens position
$\alpha, \beta$ and $\tau$=drive parameters (i.e., constants)

The motor drive duty value determined by Equation 3 is computed by lens CPU 110 which, in turn, drives motor driver circuit 114, which, in turn, drives motor 113.

The lens position and the lens speed are obtained by computing the pulse output signal of encoder 115 using lens CPU 110. As such, when a forward-return disparity in the drive capacity occurs, modifying the drive parameters, $\alpha, \beta$ and $\tau$ (i.e., values which are used to determine the motor drive duty value determined by Equation 3 according to the drive direction) enables quick and accurate stopping of the focusing optical system at the target position. When modification is not performed (i.e., in driving in the direction of an infinity position to a close-range position), the drive parameters, $\alpha, \beta$ and $\tau$, are determined so that they take on optimum values, and drive is performed in the opposite direction. Thereafter, focusing optical system L2 overruns the target position. Conversely, in driving focusing optical system L2 from a close-range position to an infinity position (i.e., when the drive parameters, $\alpha, \beta$ and $\tau$, are optimized so that they become the optimum values) and a drive operation is performed in the opposite direction, the time until an in-focus condition is reached exceeds the permissible range and becomes too long.

Figure 2:
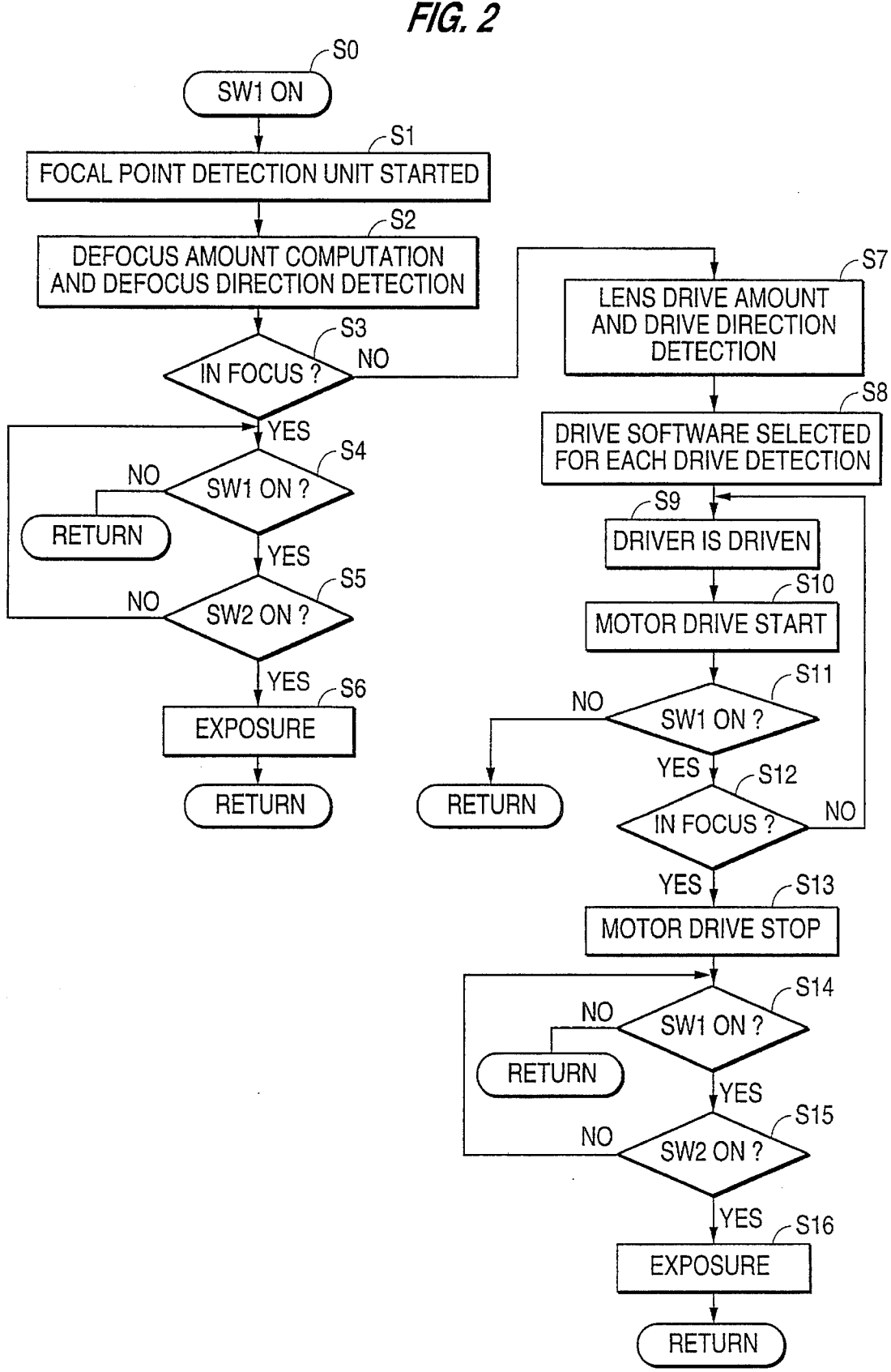
FIG. 2 is a flow chart which shows the operation of the auto-focusing device depicted in FIG. 1.

Referring now to FIGS. 2 and 3, the operational sequence when the drive parameters are modified according to the lens drive direction will be explained.

First, at step S0 the operation of pressing the release button of a camera shutter system down halfway causes switch SW1 to be turned ON. Thereafter, focal point detection unit 108, which is connected to the camera-side CPU 109, is started (step S1). Along with the starting up of focal point detection unit 108, computation of the defocus amount and detection of the defocus direction are performed (step S2). Also, judgments are made as to whether the picture-taking lens is in an in-focus condition (step S3) and whether switch SW1 is again ON when an affirmative result is obtained (step S4). Additionally, a judgment is made as to whether fully pressed switch SW2 is ON when an affirmative result is obtained (step S5). When it has been judged that the fully pressed switch SW2 has turned ON, exposure operations beginning with shutter release are performed (step S6).

When there is a negative result in step S4, that is, when it has been judged that the halfway pressed switch SW1 is not ON, processing ends, and when a negative result is obtained in step S5, there is a return to step S4.

When there is a negative result in step S3, that is, when it has been judged that the focusing lens of system L2 is not in focus, based on the results of the computation of the defocus amount and the defocus direction in step S2, the lens drive amount and the drive direction are computed by the camera-side CPU 109 (step S7).

Thereafter, the camera CPU 109 outputs drive signals for the defocus direction and the defocus amount to the lens CPU 110. The lens CPU 110 determines the drive direction of the lens based on the aforementioned operation states, and drive software which modifies the drive parameters for each drive direction is selected (step S8).

Referring now to FIG. 3, processing of the drive software selection will now be described. First, the lens drive amount and drive direction determined in step S7 are read (step S81), and a judgment is made as to whether the drive direction of the focusing optical system L2 is from a close-range position to an infinity position (step S82). In the case of a negative result, that is, when driving is done from an infinity position ∞ to a close-range position, the following equation is selected (step S83), and a return is performed:

$$Md=\alpha 1(P-Q)+\beta 1(V1-VL)+\tau 1\int(P-Q)dt \quad \text{...........Equation 4.}$$

On the other hand, in the case where a positive result is obtained, that is, when driving is done from a close-range position to an infinity position ∞, the following equation is selected (step S84), and a return is performed:

$$Md=\alpha 2(P-Q)+\beta 2(V1-VL)+\tau 2\int(P-Q)dt \quad \text{...........Equation 5.}$$

In order for the drive parameters to become the optimum values for the various drive conditions, they are determined by experimentation, for example. Additionally, heuristics may also be used.

The motor driver circuit 114 is driven (step S9) by the software selected in step S8, and the motor 113 begins to drive through the drive control of driver circuit 114 (step S10).

Next, the lens drive amount and the drive direction are detected by optical encoder 115, and a detection signal is input to the lens CPU 110 and then sent to camera CPU 109 as a drive amount signal.

Also, a judgment is made as to whether the halfway pressed switch SW1 is ON (step S11 ), and when a positive result is obtained, the lens drive amount signal and the defocus amount are compared by camera CPU 109. As such, a judgment is made as to whether the picture-taking lens of system L2 is in an in-focus condition (step S12), and when a positive result is obtained, a lens drive stop signal is sent to the lens CPU 110, and the driving of the motor 113 stops (step S13).

When there is a negative result in step S11, that is, when it has been judged that the halfway pressed switch SW1 is not ON, processing is ended.

When the driving of the motor stops in step S13, a judgment is again made as to whether the halfway pressed switch SW1 is ON (step S14), and when a positive result is obtained, a judgment is made as to whether the fully pressed switch SW2 is ON (step S15). When it has been judged that the fully pressed switch SW2 is ON, exposure operations beginning with shutter release are performed (step S16).

When a negative result is obtained in step S 14, that is, when it has been judged that the halfway pressed switch SW1 is not ON, processing is ended, and when a negative result is obtained in step S15, there is a return to step S14.

As explained in detail above, according to the embodiment of the present invention, an energizing member which eliminates play in the focusing optical system is inserted between a lens barrel anchoring section of a lens grouping and the support member of a focusing optical system. As such, the embodiment of the present invention provides that even when there is a forward-return disparity in a lens drive capacity, the drive parameters, which determine the drive capacity for driving a drive device, are optimized by modification according to the drive direction. Thus, the focusing optical system can be quickly and accurately stopped at a target position (e.g., at an in-focus position).

Although a preferred embodiment of the present invention has been shown and described, it will be readily appreciated by those skilled in the art that changes may be made in this embodiment without departing from the principles and spirit of the invention, the scope of which is defined in the appended claims and their equivalents.

What is claimed is:

1. An auto-focusing device adapted for use with a camera, the auto-focusing device comprising:

an auto-focusing optical system including a lens barrel anchoring section, a support member and a drive unit for causing said auto-focusing optical system to be moved into a desired position along the direction of the optical axis of the auto-focusing device;

an energizing member which eliminates extraneous movement of said auto-focusing optical system, said energizing member having particular energizing characteristics and being positioned between said lens barrel anchoring section and said support member;

a drive direction detection unit which detects a drive direction of said auto-focusing optical system; and a drive control unit which controls said drive unit by modifying drive control parameters, the drive control parameters being modified based on the drive direction detected by said drive direction detection unit and the particular energizing characteristics of said energizing member.

2. The auto-focusing device according to claim 1, wherein said energizing member is a spring device.

3. The auto-focusing device according to claim 1, wherein said drive detection unit comprises a microprocessor.

4. The auto-focusing device according to claim 1, wherein said drive control unit comprises a microprocessor.

5. The auto-focusing device according to claim 1, wherein the drive control parameters comprise lens drive speed, speed needed to cause said auto-focusing optical system to be moved to the desired position, the desired position of said auto-focusing optical system, and constant values.

* * * * *